(12) United States Patent
Capomassi et al.

(10) Patent No.: US 8,307,355 B2
(45) Date of Patent: Nov. 6, 2012

(54) METHOD AND APPARATUS FOR POPULATING A SOFTWARE CATALOGUE WITH SOFTWARE KNOWLEDGE GATHERING

(75) Inventors: Alessandro Capomassi, Rome (IT); Alessandro Terenzi, Ceccano (IT); Rosario Gangemi, Lavinio (IT); Luigi Pichetti, Rome (IT); Marcello Vitaletti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 1621 days.

(21) Appl. No.: 11/458,258

(22) Filed: Jul. 18, 2006

(65) Prior Publication Data
US 2007/0022023 A1    Jan. 25, 2007

(30) Foreign Application Priority Data

Jul. 22, 2005 (EP) .................................... 05106774

(51) Int. Cl.
*G06F 9/44* (2006.01)
*G06F 9/445* (2006.01)
*G06F 12/00* (2006.01)

(52) U.S. Cl. ......... 717/170; 717/122; 717/174; 707/822

(58) Field of Classification Search .................. None
See application file for complete search history.

(56) References Cited

U.S. PATENT DOCUMENTS

| | | | | |
|---|---|---|---|---|
| 5,590,056 | A * | 12/1996 | Barritz | 702/186 |
| 5,845,077 | A * | 12/1998 | Fawcett | 709/221 |
| 6,389,433 | B1 * | 5/2002 | Bolosky et al. | 707/749 |
| 6,449,764 | B1 * | 9/2002 | Sliger et al. | 717/170 |
| 7,949,691 | B1 * | 5/2011 | Franciscus de Heer et al. | 707/822 |
| 2002/0161672 | A1 * | 10/2002 | Banks et al. | 705/27 |
| 2003/0140266 | A1 * | 7/2003 | Fink et al. | 714/1 |

(Continued)

FOREIGN PATENT DOCUMENTS

WO    WO 0205184 A2 *    1/2002

OTHER PUBLICATIONS

Tsoi et al. Knowledge-based customization of enterprise applications,Expert Systems with Applications, Jul. 2003, pp. 123-132, Retrieved on [Jun. 15, 2012] Retrieved from the Internet: URL<http://www.sciencedirect.com/science/article/pii/S0957417403000125>.*

(Continued)

*Primary Examiner* — Thuy Dao
*Assistant Examiner* — Cheneca Smith
(74) *Attorney, Agent, or Firm* — Garg Law Firm, PLLC; Rakesh Garg; Libby Z. Toub

(57) ABSTRACT

A method and a corresponding apparatus for inventorying software products on a plurality of computer are proposed. The inventorying system aims at populating a software catalogue without the manual intervention of an administrator. The present invention reduces the cost of producing and maintaining a comprehensive knowledge base (the catalogue) which contains definitions of software products and the related signature. Information about software products and their related signature is obtained through a process which gathers information from a potentially very large collection of computers. Any occurrence of a group of identical files across multiple computers is considered a reliable indicator that they belong to the installation footprint of a product.

21 Claims, 4 Drawing Sheets

U.S. PATENT DOCUMENTS

| | | | |
|---|---|---|---|
| 2003/0182652 A1* | 9/2003 | Custodio | 717/122 |
| 2004/0268341 A1* | 12/2004 | Kenworthy | 717/174 |
| 2005/0022176 A1* | 1/2005 | Ramachandran et al. | 717/170 |
| 2005/0055692 A1* | 3/2005 | Lupini et al. | 717/174 |
| 2005/0091192 A1* | 4/2005 | Probert et al. | 707/1 |
| 2007/0006152 A1* | 1/2007 | Ahmed et al. | 717/122 |
| 2007/0250829 A1* | 10/2007 | Hillier et al. | 717/170 |
| 2012/0030262 A1* | 2/2012 | Barrenechea | 707/822 |

OTHER PUBLICATIONS

Menachem et al.Inventorying information technology systems: supporting the "paradigm of change", IEEE Software, Sep.-Oct. 2004, pp. 34-43, Retrieved on [Jun. 15, 2012] Retrieved from the Internet: URL<http://ieeexplore.ieee.org/stamp/stamp.jsp?tp=&arnumber=1331300>.*

\* cited by examiner

METHOD AND APPARATUS FOR POPULATING A SOFTWARE CATALOGUE WITH SOFTWARE KNOWLEDGE GATHERING

TECHNICAL FIELD

The present invention relates to the data processing field. More specifically, the present invention relates to a method of detecting the presence of software products on distributed data processing system. In particular the activity of knowledge gathering and signature generation is addressed by the present invention. The invention further relates to a computer program for performing the method, and to a product embodying the program. Moreover, the invention also relates to a corresponding apparatus.

BACKGROUND ART

Several system management software applications require the availability of a comprehensive knowledge base that contains information on software products, which may be currently installed and running on a plurality of data processing systems. For examplese license manager products like IBM Tivoli License Manager (ITLM) needs a knowledge base (i.e. a catalogue) to identify the products found on the managed systems and correctly metering and invoicing the use of such products. Another example can be configuration manager applications, e.g. IBM Tivoli Configuration Manager (ITCM) in particular the Inventory feature, or software deployment products. Normally this knowledge base is in the form of a catalogue which contains definitions of software products (e.g. product names and version) and the related signature. The software catalogue lists all the known products which can be found by on the managed systems; each product can be identified by one or more executable modules indicative of its running. As an example, in the case of a License Manager product, a licensing agent working in the background detects the executable modules that have been launched; the licensing agent then identifies the corresponding products through the software catalogue. The catalogue needs to be "populated" and this is normally a costly activity.

Several IT management solutions exist that perform the discovery of installed software for either inventory or licensing purposes. One form of software discovery that is particularly effective exploits a previously defined signature for each product that has to be discovered. The term signature means any type of information that can be consumed by a software discovery application to determine the presence of one or more instances of a software product on a given computer. A typical and particularly simple implementation of a signature is one that specifies the file-name and the file-size of a key application file. In this case, detecting a file with matching characteristics would cause the signature to be matched, thus indicating that the associated software product is installed. One advantage of a signature-based approach to software discovery is that the matching of a signature can be correlated by a management application to a precise definition (name, version, etc.) of the entity (software product) being discovered. A software inventory application which exploits signature-based discovery of installed software therefore has the need of accessing a comprehensive knowledge base of product and signature definitions. The challenge of this approach is to maintain its content up-to-date with respect to:
new software products being continuously made available;
maintenance updates to existing software products.

The lack of an industry standard for representing software signatures, let alone of a common shared repository that all software vendors could populate with knowledge about their own published software, determined the need for vendors of IT management solutions to create proprietary implementations of such a product-signature knowledge base, hereafter referred to as "KB". The value of the KB is directly proportional to the coverage and accuracy of its content, therefore the problem is how to guarantee coverage and accuracy at an affordable cost.

According to known methods normally employed to create product-signature information, one or more of the following actions is performed:
information is directly collected from the software producer (internal development department or independent software vendor);
a technical person who is experienced in the installation or use of a specific software product can manually produce accurate product and signature definitions for that product, or at least for a specific version;
a technical person who is experienced on the software installation and registration facilities available on one or more computing platforms can obtain product definitions by direct inspection of data maintained by the operating system on computers where those products have been installed, then it is possible to manually create signatures for these products based on OS registry values or installed files or both;
a technical person uses software tools that harvest information from a computer where the software is installed, in order to partially automate the activities described above.

All of the above methods have some drawbacks. The first two are only applicable to software products which are internally developed or to products for which in-depth knowledge is available. The other methods require visiting multiple computers where different versions or different maintenance levels of the same software product may be installed, as they may require different signatures. The cost of creating and maintaining the product-signature KB with the above methods are often prohibitive, which results in incomplete and obsolete content.

It is an object of the present invention to provide a method and a system which alleviates the above drawbacks.

SUMMARY OF THE INVENTION

According to the present invention we provide a method of populating a software catalogue with software product identifiers corresponding to software products being discovered on a plurality of data processing systems, the method including the steps of: scanning the file systems of the plurality of data processing system for detecting the occurrence of sets of files, each of the sets being indicative of a product being installed on a data processing system; for each of the sets, determining a corresponding product signature, the signature being associated to a software product; storing the signature and an associated software product identifier on the software catalogue.

Another aspect of the present invention provides a method for inventorying software products across a plurality of data processing system.

A further aspect of the present invention provides a computer program for performing the above-described method.

A still further aspect of the invention provides a program product embodying this program.

Moreover, another aspect of the invention provides a corresponding apparatus for implementing the above method.

The novel features believed to be characteristic of this invention are set forth in the appended claims. The invention itself, however, as well as these and other related objects and advantages thereof, will be best understood by reference to the following detailed description to be read in conjunction with the accompanying drawings.

DETAILED DESCRIPTION OF THE PREFERRED EMBODIMENT(S)

Figure 1A:
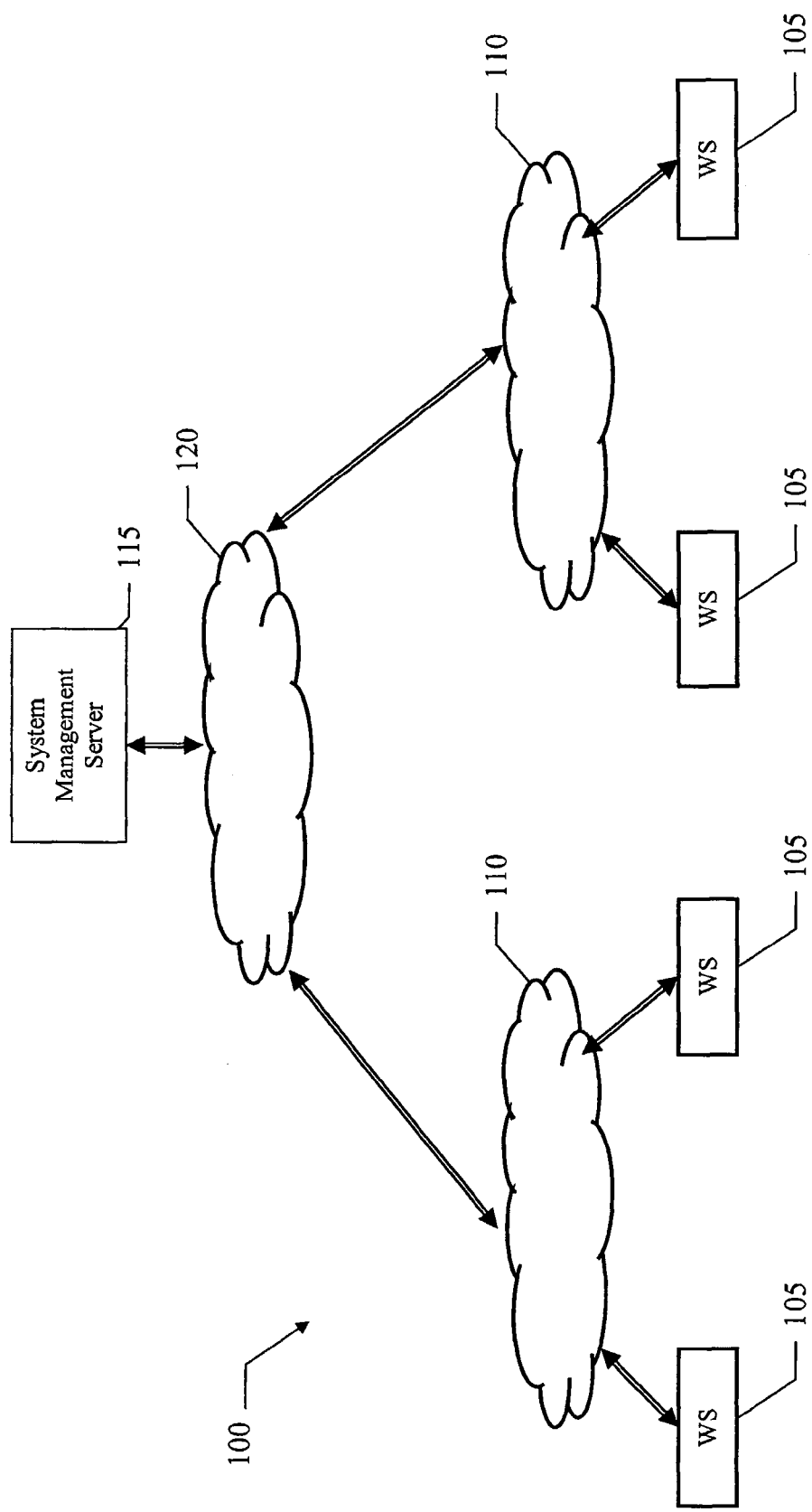
FIG. 1a is a schematic block diagram of a data processing system in which the method of the invention is applicable.

With reference in particular to FIG. 1a, a data processing system 100 with distributed architecture implementing a Software Inventory system, is depicted. The system 100 includes multiple endpoints 105, which are grouped into different sets. The endpoints 105 can be workstations, servers, laptops and more generally any kind of data processing system where a plurality of software products is installed. The endpoints 105 are connected to each other through a network 110 (for example, a LAN). The different sets of endpoints 105 communicate with a remote system management server 115 through a network 120 (for example, INTERNET-based); the system management server 115 implements a central repository where inventory data of the system 100 is collected and managed. As mentioned above, the present invention may be implemented in a license management system, but more generally in any system requiring an inventory activity, e.g. a software deployment system which needs to distribute fixes or enhancements to a plurality of workstation, after having inventoried the current status of each workstation; another possible use is within a configuration management system.

Figure 1B:
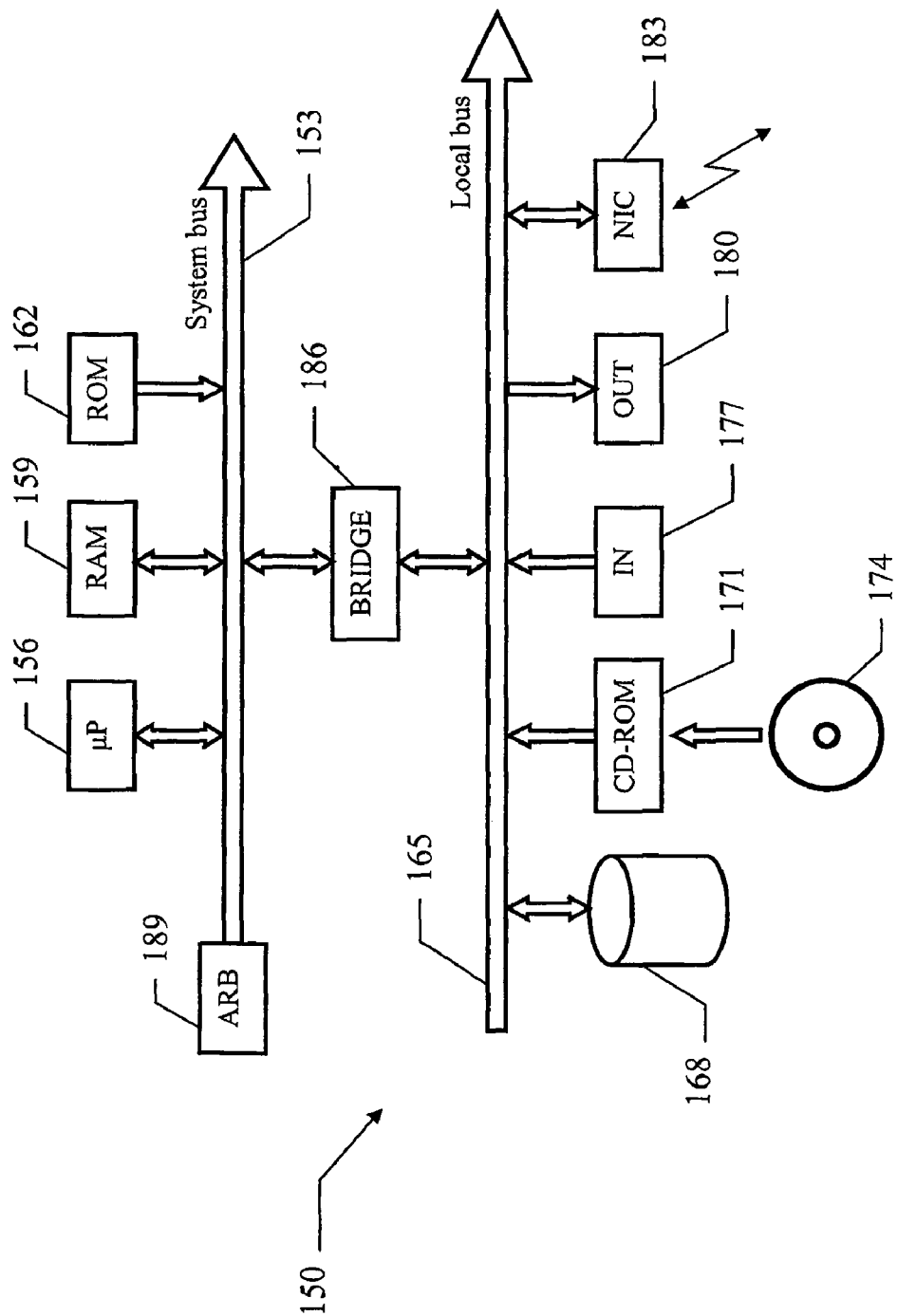
FIG. 1b shows the functional blocks of a generic computer of the system.

As shown in FIG. 1b, a generic computer of the system (workstation, local server, or system management server) is denoted with 150. The computer 150 is formed by several units that are connected in parallel to a system bus 153. In detail, one or more microprocessors (μP) 156 control operation of the computer 150; a RAM 159 is directly used as a working memory by the microprocessors 156, and a ROM 162 stores basic code for a bootstrap of the computer 150. Peripheral units are clustered around a local bus 165 (by means of respective interfaces). Particularly, a mass memory consists of a hard-disk 168 and a drive 171 for reading CD-ROMs 174. Moreover, the computer 150 includes input devices 177 (for example, a keyboard and a mouse), and output devices 180 (for example, a monitor and a printer). A Network Interface Card (NIC) 183 is used to connect the computer 150 to the network. A bridge unit 186 interfaces the system bus 153 with the local bus 165. Each microprocessor 156 and the bridge unit 186 can operate as master agents requesting an access to the system bus 153 for transmitting information. An arbiter 189 manages the granting of the access with mutual exclusion to the system bus 153.

Similar considerations apply if the system has a different topology, or it is based on other networks. Alternatively, the computers have a different structure, include equivalent units, or consist of other data processing entities (such as PDAs, mobile phones, and the like). In any case, the solution of the invention is also suitable to be used in a system wherein the control of the workstations is decentralized, or even in a stand-alone computer.

Figure 2:
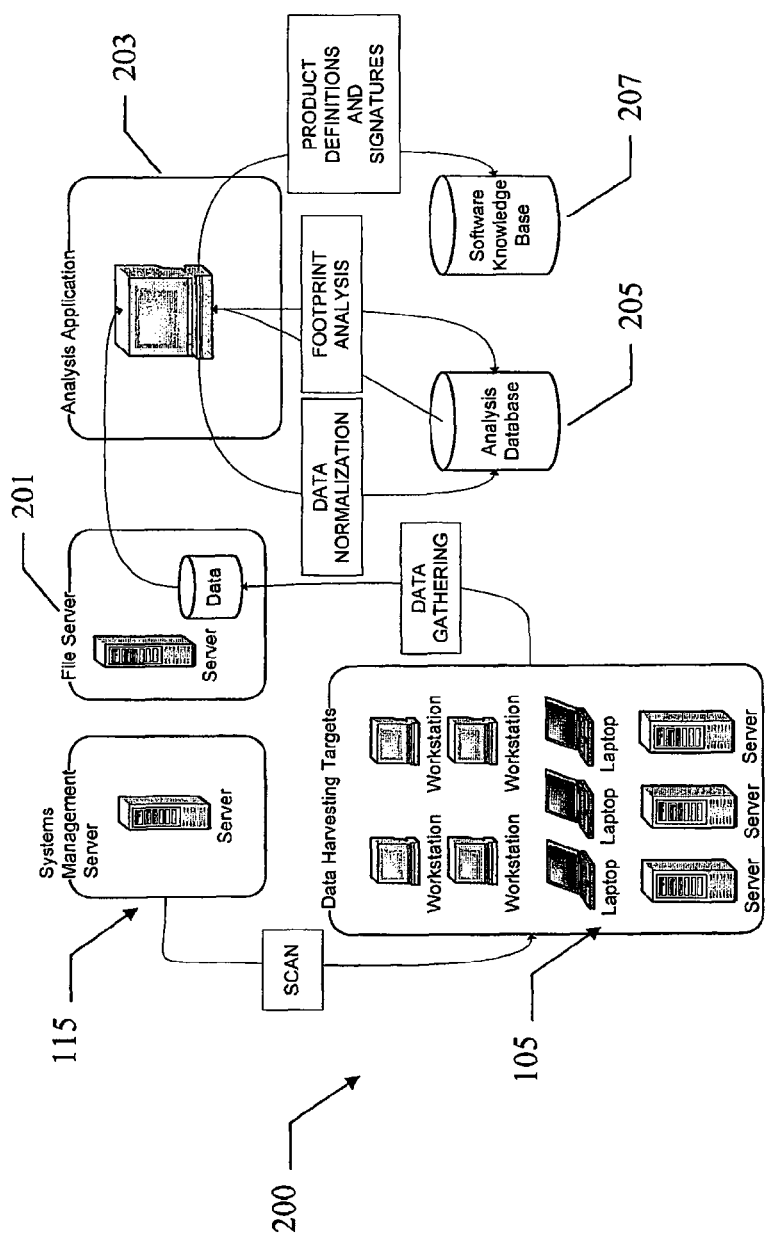
FIG. 2 depicts the main components that can be used for practicing the method.

Considering now FIG. 2, the main components that can be used to practice the method of a preferred embodiment of the invention are denoted as a whole with 200. The information (programs and data) is typically stored on the hard-disks of the different computers and loaded (at least partially) into the corresponding working memories when the programs are running.

A Systems Management Server 115 controls and executes management operations on several endpoints 105, connected by a communication network. The set of endpoints 105 includes servers, workstations, desktops or laptops, whose installed software is analyzed with the objective of enlarging the available base of product definitions and related signatures.

The Systems Management Server 115 controls management operations on a potentially large set of interconnected endpoints 105, thus avoiding the need of physically visiting each computer. This server and the underlying systems management infrastructure are used for performing a scanning operation on the managed computers with the goal of collecting raw data needed by the analysis application; and for moving data generated locally by the scanners to a central file-server 201, where these data can be stored on the server's file system. The scanning operation may be performed on all managed endpoints 105 or on a specific subset, the latter being possibly determined by their role (servers, workstations, desktops or laptops) or by the running operating system.

The data harvested from the selected computers stored in the file-system of the central file-server, from which the data can be accessed by the Analysis Application 203. Analysis Application 203 implements the data transformation and the analysis leading to the creation of new product definitions and related signatures.

The first step implemented by the Analysis Application 203 is to merge information from all scanned computers into an Analysis Database 205, in a normalized form that avoids redundancy (see Data Normalization). This information is the primary input to the analysis. In addition, this database holds the intermediate products of the analysis (footprint data) from which the application derives product definitions and signatures.

Once data are normalized, the application supports the identification of footprints (groups of files) that are representative of an installed instance of a software product (see Footprint Analysis). Each footprint needs to be correlated to a product definition which can be often derived automatically from harvested data or that can be generated by the application with input from the user. The last step implemented by the application is the generation of a product definition and a signature definition, from the available footprint data, in a format that can be stored in the Software Knowledge Base 207. A Software Knowledge Base 207 is a database holding a set of consolidated product definitions and signatures. The database can be initially empty or it can be populated with data created by a provider of software signatures. The new definitions produced by the analysis application are consolidated in this database.

Figure 3:
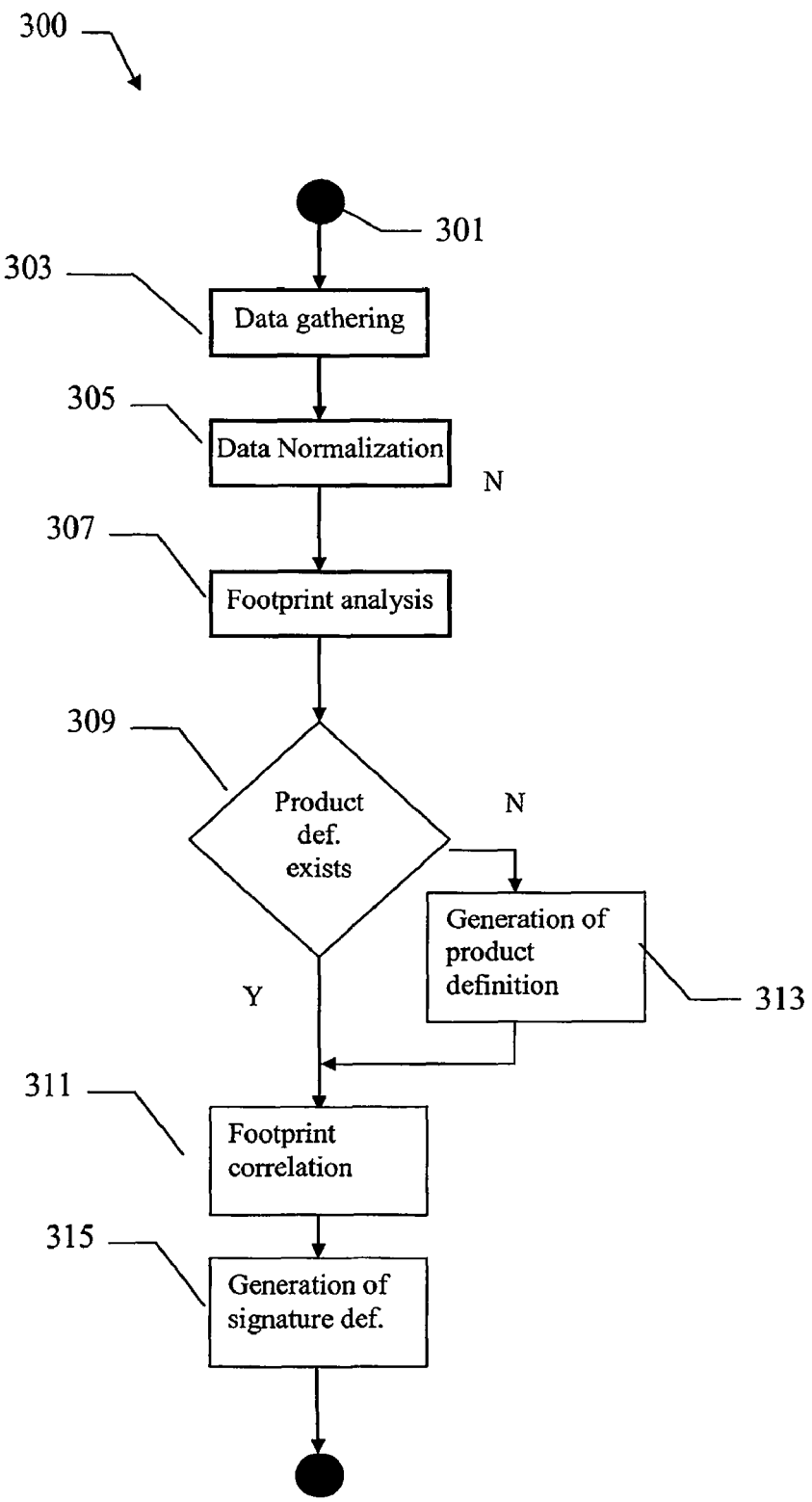
FIG. 3 show a diagram describing the flow of activities relating to an illustrative implementation of the method.

Considering now FIG. 3, the logic flow of a knowledge gathering process according to an embodiment of the invention is represented with a method 300. The method begins at the black start circle 301. Continuing to block 303 data are gathered throughout the endpoints 105. Collected data are then normalized at step 305, while at step 307 a footprint analysis is performed. At step 309 it is checked whether a matching product definition already exists: if this is the case the footprint is correlated to such definition (step 311); if not a product definition is generated according to available information and user input (step 313). Finally at step 315 a signature definition is generated. We will now see in further details each of the above steps.

Data Gathering

The following data are gathered from a potentially very large collection of available computers by a distributed application that implements the following functions:

1. Scan the machine for basic operating-system data, producing:
a. a unique identifier of the computer
b. operating system type and version
c. hardware architecture
d. optional information to help locating the machine for a direct inspection, in case that would be needed for troubleshooting;
e. key named directories that may be needed on some operating systems to help include or exclude file-system directories 2. Scan the file-system—using appropriate filters—to record the following information on files that are candidate to be representative of a product's install footprint (e.g. executable files and libraries):
a. Path name
b. File name
c. File size
d. File checksum 3. Scan the operating system or installer specific registry for information about installed products, recording the following product information:
a. Product name
b. Product Version
c. Source (registry) type 4. Use the available registry information to establish a link between products definitions collected in step 3) and candidate representative files listed on step 2). This can be done by knowing the product's install location. Alternatively, the canonical platform registry on the most popular UNIX operating systems already provides means to determine which files belong to a given registered product.

5. On some operating systems applications may register information about themselves in the form of key-data pairs appearing in a tree-like structure where the name of a key is often application specific. These registry data are extremely valuable for a human to infer an appropriate product definition (name and version) once it is possible to correlate a set of data to a group of files that is in the footprint of an otherwise unknown product. Therefore, selected sub-trees of the registry are recorded which can be correlated to one file-system directory identified in the file-system scan of step 2) according to the following matching criteria:
a. A key exists in the same registry sub-tree that conforms to the format of a file-system path-name (e.g.: starts with "X:\")
B. The value of the key, once variable substitution and other appropriate decoding is applied, matches the path-name of a file-system directory recorded in step 2)

Data Normalization

The data gathered from the target computers are processed by the analysis application which stores them in a relational database in a normalized form. The following advantages are obtained through the data normalization:

files are identified by their content (checksum and filesize) rather than their name, so that the analysis is not affected by the fact that some instances of a file may be renamed;

a single instance of the entity representing the file is stored in the database, regardless of the number of instances found across the scanned systems;

folders are identified by their content (the files satisfying the scanner's filtering criteria that are contained in that folder). Therefore, a folder entity stored in the database represents a unique aggregation of content (files). The basic identifier of a folder is therefore a digest of the contained files. The digest is computed by applying a digest algorithm (e.g. MD5) to a string whose content is a concatenation of tokens, namely one token for each file. The algorithm chosen should guarantee a negligible probability for the occurrences of "collisions". Each token consists of an expression of the form "(<file-checksum>,<file-size>)", where "<file-checksum>" and "<file-size>" are the file's checksum and size, respectively. In order to make the computed digest insensitive to any casual way of listing the folder's files, the set of all tokens is sorted and the token insertion into the final string is done according to the position of each token in the sorted set.

pathname information is not stored as part of the folder entity, but rather as a property of the associations between the folder and each computer where one or more instances of a folder with the same content has been found.

products whose name, version and source (the type of registry from where the product definition has been harvested) are equal, are likewise treated as the same entity and stored once in the database.

All relationships derived from the raw data are maintained in the database, namely:
file-folder
product-file
folder-computer
product-computer Footprint Analysis The data produced after data normalization are analyzed to identify groups of files that repeats themselves identically on multiple computers, regardless of the path-names of each file and of their parent directories, which may be different on each computer. These groups of files are hereafter referred to as footprints. The footprint identification can be totally automated, yet the application may allow the users to preview information through a graphical user interface, and exert some degree of control over the process.

The footprint identification process is implemented through the following steps:

files stored in the Analysis database are put in a list sorted by decreasing number of occurrences;

the list is scanned from the top until a file is found which does not have an associated footprint (initially no footprint exists) and that has not been marked for exclusion (initially, no file is marked for exclusion). Hereafter this file is referred to as the 'source' file.

the 'source' file is used to create a footprint in which that file would be included; the list of folders containing the file is analyzed and a set is created of all files contained in each one of the above folders (this set of course includes the 'source' file). This set, represents the set intersection of all folders where the 'source' file has been found.

the analysis application may allow the user to preview the set of folders whose intersection determines the generated footprint, in case there is the likelihood of some 'spurious' data. For example: an isolated copy of the 'source' file may be accidentally found outside of the product's install tree, in which case it could be possible to determine that the containing folder should be ignored when computing the intersection.

files belonging to the set intersection of folders containing the 'source' file are guaranteed by the process of not being part of an existing footprint, therefore they become the content of a new footprint that is stored in the Analysis Database;

files that do not belong to any footprint, and yet occur in some folder as 'companions' of a file which is part of some footprint, are marked for exclusion in the rest of the process and will not become part of any footprint.

The above process of footprint identification terminates when each file is either associated to a footprint or is marked for exclusion.

A further step which can help the visualization of a product's installation tree composed of multiple folders can be performed by the analysis application by establishing a parent-child relationship among any pair of footprints A and B when each instance of the folders whose intersection defines the footprint A is found to be in the parent-child relationship with a corresponding instance of a folder related to the definition of the footprint B. By this approach it is possible to construct a tree structure of footprints evidently related to the installation tree of a single product.

Footprint Correlation to One Harvested Product Definition

In order to possibly associate a footprint to a product definition, it is sufficient that the latter could be harvested on even a single computer and that it was possible to associate the footprint with that product on that computer. This is especially powerful on UNIX environments where the product may have been installed in a canonical form (including registration) on only a few computers while it may have been simply cloned on the production environment with loss of the registry information. Therefore, for groups of files that satisfy the above condition, a definition of the product is immediately available and can be presented to the user for review and acceptance.

Computer Aided Creation of a Product Definition

This step is needed for the computer aided creation of product definitions that can be associated to groups which were not automatically correlated to one harvested product definition, as in the previous step. The computer aid tool guides the user to find the elements of a product's definition (name, version) by navigating the additional registry information collected in step 5) of the data gathering process. The navigation is restricted to registry sub-trees that were correlated to the files according to the criteria described in step 5) of the data gathering process, namely by matching some key value with the file path-names.

Signature Definition

A signature definition can be generated automatically based on the available information. Alternatively, computer-aided generation can be chosen to let the user exert control on the characteristics of the signature like, for example:

Selection of a single file, among the many included in a file-group, that is to be used for the signature definition.

In general, the capability of a discovery engine to handle complex signatures makes it possible to fully leverage the collected information to create a signature that is both selective and robust (e.g. with respect to software updates).

In this way, it's is possible to obtain robust Sw signatures to be used for SW discovery. A so obtained signature, is needed either because no SW signature was available before, or because the former known SW signature does not work. This latter case can happen, for instance, because a SW product have been deployed in a custom manner without executing its regular installation process (e.g. SW binaries were unpackaged from a customer assembled bundle, which did not contain the expected signature).

As an additional feature, in some circumstances, a reliability score could be assigned to each footprint, based on several parameters (e.g. the number of occurrences, or the size of the footprint). In the same way the association between a signature and a software product identifier could be assigned a reliability indicator, and a decision of whether to automatically assign the signature to such product could be made dependent on such indicator: if the indicator does not reach a minimum thresholds, the intervention of an administrator could be invoked.

Similar considerations apply if the programs and data are structured in a different manner, if other modules or functions are provided, or if the information is stored in equivalent memory structures.

Similar considerations apply if the method includes equivalent or additional steps.

Alternatively, for example different methods of obtaining the information on the inspected endpoints can be used, depending also on the operating system on which the system is installed.

Although the invention has been described above with a certain degree of particularity with reference to preferred embodiment(s) thereof, it should be understood that various changes in the form and details as well as other embodiments are possible. Particularly, it is expressly intended that all combinations of those elements and/or method steps that substantially perform the same function in the same way to achieve the same results are within the scope of the invention.

In any case, the method of the invention can be used for inventorying any kind of software products (such as video games, multimedia works, and the like.

In addition, the programs can be distributed on any other computer readable medium (such as one or more DVDs); alternatively, the programs are pre-loaded onto the hard-disks, are transmitted to the computers, are broadcast, or more generally are provided in any other form directly loadable into the working memories of the computers.

Moreover, it will be apparent to those skilled in the art that the additional features providing further advantages are not essential for carrying out the invention, and may be omitted or replaced with different features.

In any case, the method according to the present invention is also suitable to be carried out with a hardware structure (for example, integrated in a chip of semiconductor material), or with a combination of software and hardware.

Naturally, in order to satisfy local and specific requirements, a person skilled in the art may apply to the solution described above many modifications and alterations all of which, however, are included within the scope of protection of the invention as defined by the following claims.

The invention claimed is:

1. A method executed by a processor of populating a software catalogue with software product identifiers corresponding to software products being discovered on a plurality of data processing systems, the method including the steps of:

scanning file systems of the plurality of data processing systems for detecting occurrences of sets of files, each of the sets being indicative of a licensed software product being installed on a corresponding data processing system;

normalizing the sets of files;

for each of the normalized sets, determining a corresponding product signature using a footprint associated with an installation of the licensed software product, the product signature being associated with the software product, the footprint comprising size and checksum pairs and information of an identified file and information of a second file which occur in all the sets containing the identified file;

and storing the product signature and an associated software product identifier in the software catalogue, wherein the signature in the software catalogue is used to identify an invocation of the licensed software product.

2. The method of claim 1, wherein the scanning activity is limited to executable files and libraries.

3. The method of claim 1 wherein the signature further includes a file identifier associated to one of the files of the corresponding set of files, wherein the file identifier includes a size and a checksum instead of a file name of the one of the files.

4. The method of claim 1, wherein the signature further includes registry information derived from at least one of the files of the corresponding set of files.

5. The method of claim 1, wherein the scanning activity further includes:
identifying a plurality of files on the plurality of data processing systems;
creating a list containing the plurality of identified files;
sorting the list according to number of occurrences of each identified file, each file being identified using a size and a checksum instead of a name such that occurrences of differently named files are counted as occurrences of a common identified file;
starting from the identified file with the highest occurrence, selecting one identified file on the list until the list has been scanned; and
for each selected file, creating a footprint, the footprint including size and checksum pairs of those identified files which occur in all the sets containing the selected file, and deleting from the sorted list all the identified files included in the footprint of the selected file.

6. The method of claim 5, further comprising:
locating a file remaining on the list and not belonging to any footprint;
marking the located file as a companion of a file which is a part of at least one footprint; and
further marking the located file for exclusion such that the located file will not be made part of any footprint.

7. The method of claim 6, wherein marking the located file as excluded results in excluding from the footprints spurious data found during the scanning of one of the data processing systems.

8. The method of claim 5, further comprising:
associating pairs of footprints associated with different identified files in parent-child relationships thereby forming a tree of footprints; and
using the tree of footprints as the footprint associated with the installation of the software product.

9. The method of claim 1, wherein the footprint excludes information of a third file which occurs in less than all the sets that contain the selected file, and wherein the signature includes the footprint.

10. The method of claim 1, wherein the method is used for inventorying software products, across a plurality of data processing system.

11. The method of claim 1 wherein the signature further includes a file identifier associated to one of the files of the corresponding set of files, wherein the file identifier includes a size and a checksum instead of a file name of the one of the files.

12. A computer program product in a computer readable storage device for populating a software catalogue with software product identifiers corresponding to software products being discovered on a plurality of data processing systems, comprising:

instructions for scanning file systems of the plurality of data processing systems for detecting occurrences of sets of files, each of the sets being indicative of a licensed software product being installed on a corresponding data processing system;

instructions for normalizing the sets of files;

instructions for each of the normalized sets, determining a corresponding product signature using a footprint associated with an installation of the licensed software product, the product signature being associated with the licensed software product, the footprint comprising size and checksum pairs and information of an identified file and information of a second file which occur in all the sets containing the identified file; and instructions for storing the product signature and an associated licensed software product identifier in the software catalogue, wherein the signature in the software catalogue is used to identify an invocation of the licensed software product.

13. The computer program product of claim 12, wherein the scanning activity is limited to executable files and libraries.

14. The computer program product of claim 12, wherein the signature further includes registry information derived from at least one of the files of the corresponding set of files.

15. The computer program product of claim 12, wherein the instructions for scanning activity further includes:
instructions for identifying a plurality of files on the plurality of data processing systems;
instructions for creating a list containing the plurality of identified files;
instructions for sorting the list according to number of occurrences of each identified file, each file being identified using a size and a checksum instead of a name such that occurrences of differently named files are counted as occurrences of a common identified file;
instructions for starting from the identified file with the highest occurrence, selecting one identified file on the list until the list has been scanned; and
instructions for, for each selected file, creating a footprint, the footprint including size and checksum pairs of those identified files which occur in all the sets containing the selected file, and deleting from the sorted list all the identified files included in the footprint of the selected file.

16. The computer program product of claim 15, further comprising:
instructions for locating a file remaining on the list and not belonging to any footprint;
instructions for marking the located file as a companion of a file which is a part of at least one footprint; and
instructions for further marking the located file for exclusion such that the located file will not be made part of any footprint.

17. The computer program product of claim 16, wherein marking the located file as excluded results in excluding from the footprints spurious data found during the scanning of one of the data processing systems.

18. The computer program product of claim 15, further comprising:
  instructions for associating pairs of footprints associated with different identified files in parent-child relationships thereby forming a tree of footprints; and
  instructions for using the tree of footprints as the footprint associated with the installation of the software product.

19. The computer program product of claim 12, wherein the footprint excludes information of a third file which occurs in less than all the sets that contain the selected file, and wherein the signature includes the footprint.

20. A system for populating a software catalogue with software product identifiers corresponding to software products being discovered on a plurality of data processing systems, comprising:
  a storage device including a storage medium, wherein the storage device stores computer usable program code; and
  a processor, wherein the processor executes the computer usable program code, and wherein the computer usable program code comprises:
  computer usable code for scanning the file systems of the plurality of data processing systems for detecting the occurrence of sets of files, each of the sets being indicative of a licensed software product being installed on a corresponding data processing system, wherein the scanning further comprises:
    computer usable code for identifying a plurality of files on the plurality of data processing systems;
    computer usable code for creating a list containing the plurality of identified files;
    computer usable code for sorting the list according to number of occurrences of each identified file, each file being identified using a size and a checksum instead of a name such that occurrences of differently named files are counted as occurrences of a common identified file;
    computer usable code for starting from the identified file with the highest occurrence, selecting one identified file on the list until the list has been scanned; and
    computer usable code for, for each selected file, creating a footprint, the footprint including size and checksum pairs of those identified files which occur in all the sets containing the selected file, and deleting from the sorted list all the identified files included in the footprint of the selected file;
  computer usable code for normalizing the sets of files;
  computer usable code for, for each of the normalized sets, determining a corresponding product signature using a footprint associated with an installation of the licensed software product, the product signature being associated with the licensed software product; and
  computer usable code for storing the signature and an associated software product identifier in the software catalogue, wherein the signature in the software catalogue is used to identify an invocation of the licensed software product.

21. A system for populating a software catalogue with software product identifiers corresponding to software products being discovered on a plurality of data processing systems, comprising:
  means for scanning the file systems of the plurality of data processing systems for detecting the occurrence of sets of files, each of the sets being indicative of a licensed software product being installed on a corresponding data processing system, wherein the scanning further comprises:
    means for identifying a plurality of files on the plurality of data processing systems;
    means for creating a list containing the plurality of identified files;
    means for sorting the list according to number of occurrences of each identified file, each file being identified using a size and a checksum instead of a name such that occurrences of differently named files are counted as occurrences of a common identified file;
    means for starting from the identified file with the highest occurrence, selecting one identified file on the list until the list has been scanned; and
    means for, for each selected file, creating a footprint, the footprint including size and checksum pairs of those identified files which occur in all the sets containing the selected file, and deleting from the sorted list all the identified files included in the footprint of the selected file;
  means for normalizing the sets of files;
  means for, for each of the normalized sets, determining a corresponding product signature using a footprint associated with an installation of the licensed software product, the product signature being associated with the licensed software product; and
  means for storing the signature and an associated software product identifier in the software catalogue, wherein the signature in the software catalogue is used to identify an invocation of the licensed software product.

* * * * *